(12) United States Patent
Adya et al.

(10) Patent No.: US 8,707,318 B2
(45) Date of Patent: Apr. 22, 2014

(54) PARTITIONING SYSTEM INCLUDING A GENERIC PARTITIONING MANAGER FOR PARTITIONING RESOURCES

(75) Inventors: Atul Adya, Bellevue, WA (US); Alastair Wolman, Seattle, WA (US); John D. Dunagan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 11/958,388

(22) Filed: Dec. 18, 2007

(65) Prior Publication Data

US 2009/0100436 A1    Apr. 16, 2009

Related U.S. Application Data

(60) Provisional application No. 60/998,647, filed on Oct. 12, 2007.

(51) Int. Cl.
*G06F 9/46* (2006.01)

(52) U.S. Cl.
USPC ........................................................ 718/104

(58) Field of Classification Search
None
See application file for complete search history.

(56) References Cited

U.S. PATENT DOCUMENTS

| | | | | |
|---|---|---|---|---|
| 5,701,480 A | * | 12/1997 | Raz | 718/101 |
| 5,884,024 A | * | 3/1999 | Lim et al. | 726/3 |
| 6,144,983 A | * | 11/2000 | Klots et al. | 718/104 |
| 6,704,756 B2 | * | 3/2004 | Wollrath et al. | 1/1 |
| 6,775,703 B1 | * | 8/2004 | Burns et al. | 709/228 |
| 6,862,666 B2 | * | 3/2005 | Chong et al. | 711/152 |
| 6,917,976 B1 | * | 7/2005 | Slaughter et al. | 709/226 |
| 7,124,131 B2 | | 10/2006 | Guthridge et al. | |
| 7,171,590 B2 | | 1/2007 | Kadoi | |
| 7,260,543 B1 | * | 8/2007 | Saulpaugh et al. | 705/307 |
| 7,266,822 B1 | * | 9/2007 | Boudnik et al. | 718/100 |
| 7,272,664 B2 | * | 9/2007 | Arimilli et al. | 709/250 |
| 7,426,721 B1 | * | 9/2008 | Saulpaugh et al. | 717/144 |
| 7,458,082 B1 | * | 11/2008 | Slaughter et al. | 719/328 |
| 7,533,141 B2 | * | 5/2009 | Nadgir et al. | 709/200 |
| 7,685,144 B1 | * | 3/2010 | Katragadda | 707/999.101 |
| 7,774,782 B1 | * | 8/2010 | Popescu et al. | 718/104 |
| 7,865,898 B2 | * | 1/2011 | Vaidyanathan et al. | 718/105 |
| 7,941,401 B2 | * | 5/2011 | Okamoto | 707/636 |
| 7,962,915 B2 | | 6/2011 | Eshel et al. | |
| 8,082,491 B1 | * | 12/2011 | Abdelaziz et al. | 715/234 |
| 8,266,634 B2 | * | 9/2012 | Wolman et al. | 719/318 |

(Continued)

OTHER PUBLICATIONS

"Adaptive Soft-State Protocol in Replica Location Services", http://www.cs.virginia.edu/~son/cs662.f07/proj/sangmin.pro.doc, at least as early as Sep. 26, 2007, 6 pages.

(Continued)

*Primary Examiner* — Emerson Puente
*Assistant Examiner* — Hiren Patel
(74) *Attorney, Agent, or Firm* — Bryan Webster; Andrew Sanders Micky Minhas

(57) ABSTRACT

The application discloses a generic partitioning manager for partitioning resources across one or more owner nodes. In illustrated embodiments described, the partitioning manager interfaces with the one or more owner nodes through an owner library. A lookup node or application interfaces with the partitioning manager through the lookup library to lookup address or locations of the partitioned resources. In illustrated embodiments, resources are partitioned via the partitioning manager in response to lease request messages from an owner library. In illustrated embodiments, the lease grant message includes a complete list of the leases for the owner node.

16 Claims, 8 Drawing Sheets

(56) References Cited

U.S. PATENT DOCUMENTS

| | | | |
|---|---|---|---|
| 8,275,912 B2* | 9/2012 | Kakivaya et al. | 709/251 |
| 2001/0000812 A1* | 5/2001 | Waldo et al. | 709/225 |
| 2002/0078213 A1* | 6/2002 | Chang et al. | 709/229 |
| 2003/0023826 A1* | 1/2003 | McMichael et al. | 711/173 |
| 2003/0041141 A1* | 2/2003 | Abdelaziz et al. | 709/223 |
| 2003/0105882 A1* | 6/2003 | Ali et al. | 709/310 |
| 2003/0145210 A1* | 7/2003 | Taylor | 713/182 |
| 2003/0172106 A1* | 9/2003 | Highleyman et al. | 709/106 |
| 2004/0042446 A1* | 3/2004 | Koch et al. | 370/352 |
| 2004/0162871 A1* | 8/2004 | Pabla et al. | 709/201 |
| 2004/0202466 A1* | 10/2004 | Koch et al. | 398/1 |
| 2004/0215640 A1* | 10/2004 | Bamford et al. | 707/100 |
| 2004/0215905 A1* | 10/2004 | Armstrong et al. | 711/156 |
| 2005/0086384 A1* | 4/2005 | Ernst | 709/248 |
| 2005/0108362 A1* | 5/2005 | Weinert et al. | 709/217 |
| 2005/0114291 A1* | 5/2005 | Becker-Szendy et al. | 707/1 |
| 2005/0203962 A1* | 9/2005 | Zhou et al. | 707/200 |
| 2005/0235289 A1* | 10/2005 | Barillari et al. | 718/100 |
| 2005/0240621 A1* | 10/2005 | Robertson et al. | 707/102 |
| 2005/0289098 A1* | 12/2005 | Barsness et al. | 707/1 |
| 2005/0289240 A1* | 12/2005 | Cheshire et al. | 709/242 |
| 2006/0015507 A1* | 1/2006 | Butterworth et al. | 707/10 |
| 2006/0036896 A1* | 2/2006 | Gamache et al. | 714/4 |
| 2006/0085648 A1* | 4/2006 | Cheston et al. | 713/182 |
| 2006/0136369 A1 | 6/2006 | Douceur et al. | |
| 2006/0168154 A1 | 7/2006 | Zhang et al. | |
| 2006/0184528 A1 | 8/2006 | Rodeh | |
| 2006/0277180 A1* | 12/2006 | Okamoto | 707/7 |
| 2007/0043771 A1 | 2/2007 | Ludwig et al. | |
| 2007/0156588 A1* | 7/2007 | Howell et al. | 705/51 |
| 2007/0174428 A1* | 7/2007 | Lev Ran et al. | 709/218 |
| 2007/0271365 A1* | 11/2007 | Revanuru et al. | 709/223 |
| 2008/0209434 A1* | 8/2008 | Queck et al. | 718/105 |

OTHER PUBLICATIONS

Chervenak, et al., "Giggle: A Framework for Constructing Scalable Replica Location Services", University of Southern California, Marina del Rey, CA, IEEE, at least as early as Sep. 26, 2007; 17 pages.

Mahalingam, et al., "Data Migration in a Distributed File Service", CA, USA, http://www.hpl.hp.com/techreports/2001/HPL-2001-128.ps, 11 pages.

Yun, et al., "Sharp: An Architecture for Secure Resource Peering", Date: Oct. 19-22, 2003, New York, USA; 16 pages.

Gray et al., "Leases: An Efficient Fault-Tolerant Mechanism for Distributed File Cache Consistency", Computer Science Department, Stanford University, at least as early as Sep. 26, 2007; pp. 202-210.

Burrows, Mike; "The Chubby lock service for loosely-coupled distributed systems", Google Inc., at least as early as Sep. 26, 2007; 16 pages.

Prosecution History for U.S. Appl. No. 11/958,392, filed Dec. 18, 2007.

* cited by examiner

PRM Lease Table —150

| Bucket or SummaryKeyRange | Lease Version | Expiry Time | NodeAddress |
|---|---|---|---|
| 0-5 | 0 | 12:00:20 | 1.1.1.1:3000 |
| 6-10 | 1 | ———— | ———————— |
| 11-15 | 0 | 12:00:20 | 1.1.1.1:3000 |

Owner Library Lease Table 152

| Bucket or SummaryKeyRange | Lease Version | Expiry Time |
|---|---|---|
| 0-5 | 0 | 12:00:15 |
| 11-15 | 0 | 12:00:15 |

Lookup Library Cache 160

| Bucket | NodeAddress |
|---|---|
| 0-5 | 1 . 1 . 1 . 1 : 3000 |
| 6-10 | 2 . 2 . 2 . 2 : 4000 |
| 11-15 | 1 . 1 . 1 . 1 : 3000 |
| 16-20 | 2 . 2 . 2 . 2 : 4000 |

*Fig. 10*

PRM Bucket Crash Table 164

| Time | Buckets |
|---|---|
| 12 : 00 : 02 | 0-5, 20-27 |
| 12 : 00 : 05 | 30-34, 40-42, 51-60 |

*Fig. 11*

PRM Cache of Lookup Libraries 174

| NodeAddress | TimeLastHeardFromNode |
|---|---|
| 1 . 1 . 1 . 1 : 3000 | 12 : 00 : 01 |
| 2 . 2 . 2 . 2 : 4000 | 12 : 00 : 03 |

*Fig. 12*

PARTITIONING SYSTEM INCLUDING A GENERIC PARTITIONING MANAGER FOR PARTITIONING RESOURCES

CROSS-REFERENCE TO RELATED APPLICATION

This application claims priority to Provisional application, Ser. No. 60/998,647 filed Oct. 12, 2007 and entitled "A LEASE MANAGEMENT SYSTEM HAVING APPLICATION FOR PARTITIONING SOFT STATE DATA".

BACKGROUND

Communication or messaging devices such as desktop personal computers, mobile computing devices or cellular phones access or retrieve data from a remote data center including one or more nodes or servers. Often, resources or data of the data center must be partitioned across one or more owner nodes or servers of the data center. This is often done via a partitioning manager that uses messages to assign ownership for certain resources to nodes. During the partition grant process grant messages to the owner nodes can be interrupted and lost. Additionally, depending upon the architecture of the partitioning manager, there may be multiple instances of a single logical resource, creating confusion over the contents of the resource.

SUMMARY

The application discloses a generic partitioning manager for partitioning resources across one or more owner nodes. In illustrated embodiments described herein, the partitioning manager interfaces with the one or more owner nodes through an owner library. A lookup node interfaces with the partitioning manager through a lookup library to lookup addresses or locations of partitioned resources. In illustrated embodiments, resources are partitioned via leases, which are granted via the partitioning manager in response to lease request messages from owner libraries. In an illustrated embodiment, the owner nodes request all leases that they are entitled to, allowing the partitioning manager to spread the resources across all owners while taking multiple concerns into account, such as load on the owner nodes. In illustrated embodiments, the lease grant message includes a complete list of the leases for the owner node.

BRIEF DESCRIPTION OF THE DRAWINGS

FIG. 10 illustrates an embodiment of a lookup library cache table.

FIG. 11 illustrates an embodiment of a partitioning and recovery manager bucket crash table.

FIG. 12 illustrates a partitioning and recovery manager cache of lookup libraries.

DETAILED DESCRIPTION

Figure 1:
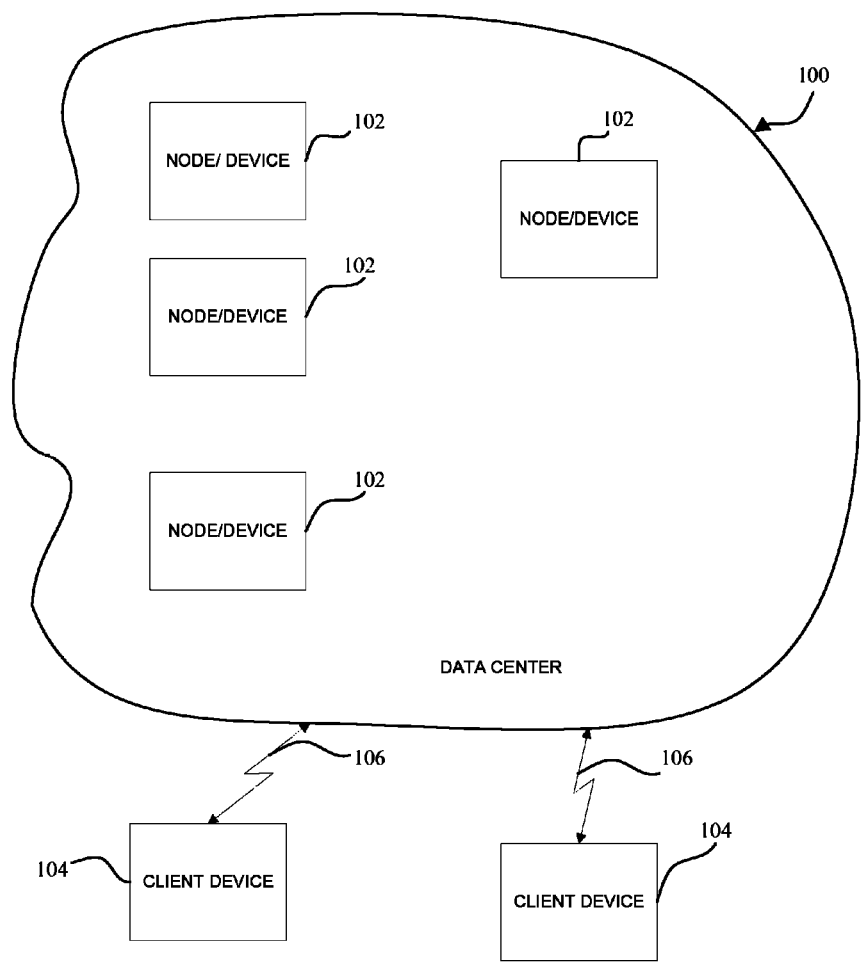
FIG. 1 is a schematic illustration of a data center in which embodiments described in the application are utilized.

FIG. 1 schematically illustrates a data center 100 for processing and storing data implementable on a computer readable medium. As shown, the data center 100 includes one or more nodes or servers 102. As shown, one or more clients or devices 104 such as desktop personal computers, mobile computing devices, cellular phones, or other computing devices communicate with the data center 100 via a communication interface 106 such as a wired network interface, a wireless network interface, or some other network interface.

Figure 2:
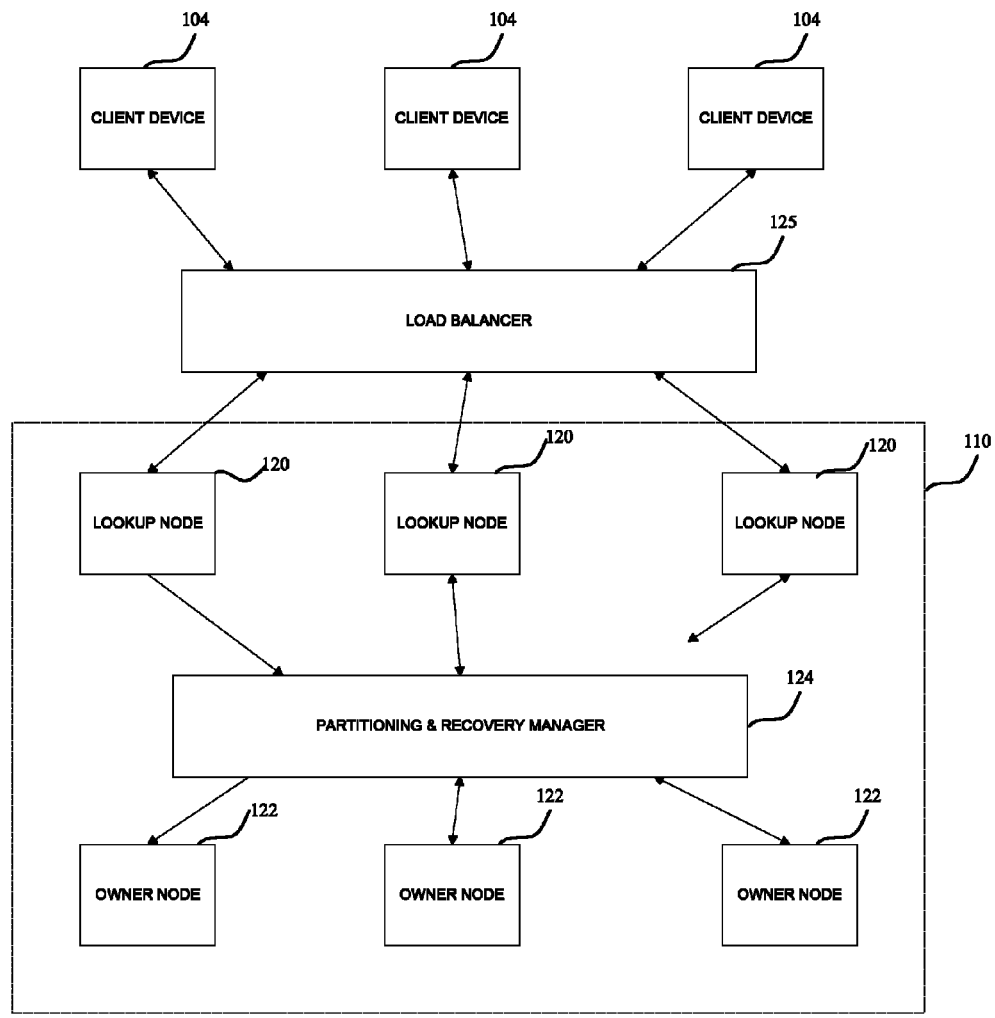
FIG. 2 is a schematic illustration of a data center including a plurality of lookup nodes that interface with a plurality of owner nodes through a partitioning and recovery manager.

In an illustrated embodiment shown in FIG. 2, the data center or system 100 includes one or more clusters 110 of nodes or devices (only one cluster is shown in FIG. 2). The nodes or devices are computing devices or servers that execute computer readable instructions. As shown, the cluster 110 includes one or more lookup nodes 120, one or more owner nodes 122 and a partitioning and recovery manager 124. The partitioning and recovery manager 124 is configured to partition data or objects on the one or more owner nodes or devices 122.

In the illustrated embodiment, the one or more client devices 104 communicate with the data center 100 through the one or more lookup nodes 120 via a load balancer 125. The load balancer 125 directs or distributes incoming operations or messages across the nodes 120. Thus, in an illustrated embodiment, the lookup nodes 120 and the owner nodes 122 communicate using a communication layer. Furthermore, in an illustrated embodiment, the owner nodes 122 define a storage layer. In embodiments described herein, the lookup nodes 120 and owner nodes 122 interface through the partitioning and recover manager 124 for the purpose of partitioning resources and delivering recovery notifications.

Figure 3:
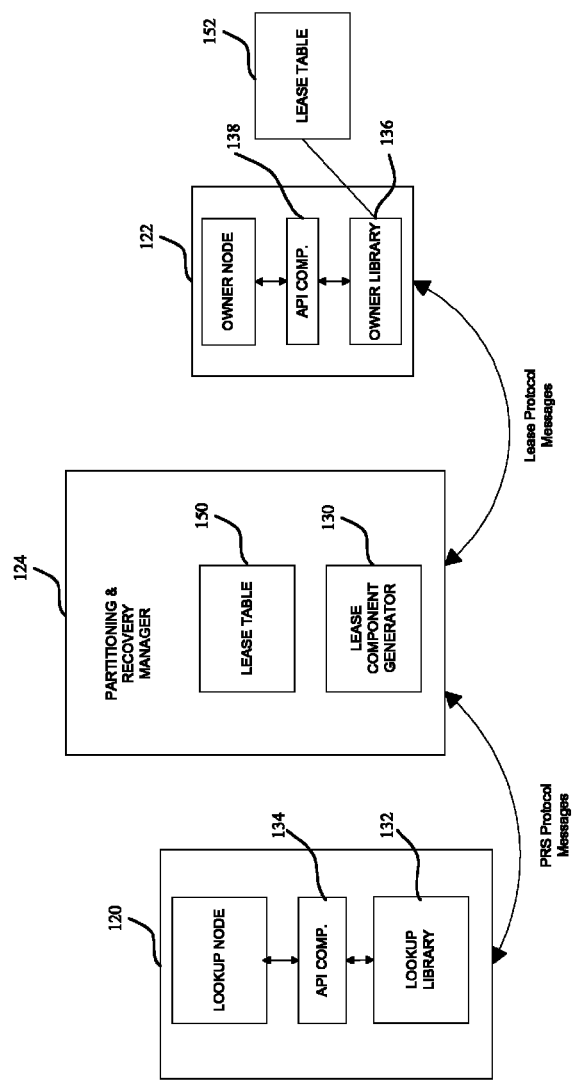
FIG. 3 is a schematic illustration of a partitioning and recovery manager, lookup nodes and owner nodes.

In the embodiment illustrated in FIG. 3, the partitioning and recovery manager 124 allocates ownership of resources or data to the one or more owner nodes 122. In particular, in the embodiment shown in FIG. 3, the partitioning and recovery manager 124 allocates ownership via leases. In some traditional lease management systems, the requester of the lease specifies which items it is interested in receiving a lease on. In an illustrated embodiment described herein, the requester of the lease specifies a general interest in being assigned some leases, and the partitioning manager 124 assigns it the appropriate leases so as to partition resources appropriately across the system. This role for the partitioning manager 124 is referred to as the partitioning manager being responsible for assigning ownership.

As shown, leases are generated via a lease generator component 130 based upon load measurements and other status of the one or more owner nodes 122, such as the liveness status. Data may be described as either soft state data, data that is likely to be lost in the event of a routine failure, such as the crash of an individual computer, or hard state data, data that is unlikely to be lost except in the event of a catastrophic failure, such as the data center 100 being hit by a meteor.

In the illustrated embodiment, the lease generator component 130 generates leases for soft state data or other resources. In an alternative embodiment, the lease generator component 130 generates leases for hard state data or other resources. The leases illustratively include a lease time frame or expiration and a lease version as described in more detail in the application.

Although in the embodiment described, ownership is allocated via leases, application is not limited to a lease-based system and embodiments described herein can be implemented on a non-lease based system. In Another embodiment, the owner nodes 122 request ownership of a lease for a particular resource or bucket and the partitioning and recovery manager 124 assign ownership based upon the owner node's request 122.

The lookup node 120 is configured to lookup partitioned resources on behalf of requests initiated by the client devices 104. As shown in FIG. 3, the lookup nodes 120 interface with the partitioning and recovery manager 124 via methods or functions of a lookup library 132 through application program interface (API) 134. The owner nodes 122 interface with the partitioning and recovery manager 124 via methods and functions of an owner library 136 through application program interface (API) 138.

As described, the partitioning and recover manager 124 is not otherwise integrated with the storage layer at the owner nodes 122 or the communication layers between the lookup nodes 120 and the owner nodes 122. By not being integrated with the storage and communication layers, the system achieves its goal of being usable in the context of many different services. To implement some new application, it is only necessary to write new code at the owner node 122 and or lookup node 120 and to use the API exposed by the lookup and owner libraries 132 and 136. Because it is not integrated with the storage and communication layers, the partitioning and recovery manager 124 communicates with the lookup nodes 120 and owner nodes 122 through communication protocols or calls described herein.

In illustrated embodiments, resources are hashed into buckets for lease generation and management. The hashed resources or objects are represented by SummaryKeys using a SummaryKeyRange or ResourceKeyRange, which stores the low and high endpoints for a hash range. A SummaryKey is a 64 bit entity that corresponds to a hash of a resource address. In one embodiment, the partitioning and recovery manager 124 maps buckets directly to servers or nodes 122.

Figure 4:
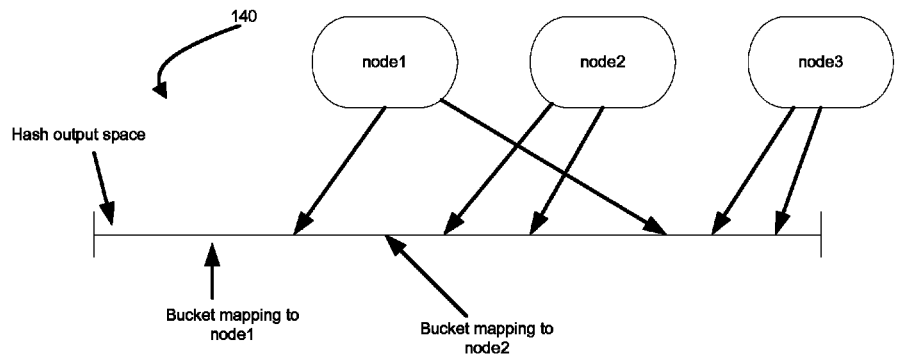
FIG. 4 is an illustrated embodiment of a hash output for a bucket or group of resources.

For example, a first fixed number of buckets are mapped to the first server or node and a second fixed number of buckets are mapped to a second server or node. The split of the hash space into buckets may be constant, with each bucket containing a constant fraction of the hash space, or the split of the hash space into buckets may be a function of the nodes currently in the system. For example, given a list of nodes (e.g. node1, node2, etc) and a virtual node count for each node, each node is mapped to as many points in the hash output space 140 as its virtual node count as illustrated in FIG. 4. For example if node1 has a virtual node count of 3, node1 is mapped to (hash(node1:1)hash(node1:2),hash(node1:3). The buckets are the continuous ranges between any two such points in the hash output space and each bucket belongs to the node that contributed its right end point.

The consistent hashing state is simply represented using an array of tuples of the form: (<serverid or node address, virtual server count, start offset>). To obtain the range in the output space of each bucket one simply computes hash (<serverid/nodeaddress,start offset+0>), hash(,serverid>:<start offset>+1)..., for all serverids or node addresses and then sorts them. The values between the sorted hash values are the range of each bucket.

Figure 5:
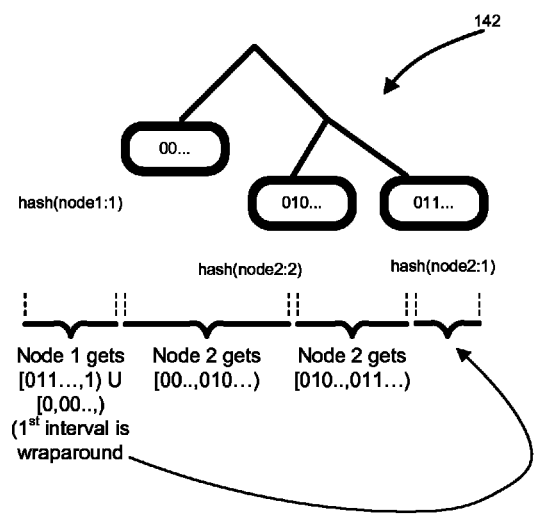
FIG. 5 illustrates a tree for hashed data structure.

In an illustrated data structure the buckets are represented using a binary tree 142 as illustrated in FIG. 5. This requires one insertion into a binary tree for each virtual node (node X's Yth virtual node requires inserting hash (nodeX:Y). Once all the insertions have been done, each range between two leaves of the tree is assigned to the right hand successor leaf node as illustrated in FIG. 5. In one embodiment a SHA1 (Secure Hash Algorithm #1) is used, although application is not limited to a particular embodiment described. Although a consistent hashing technique is described, application is not limited to any particular hashing technique or bucketization approach. For example in another embodiment the system uses a bucketization that implements both consistent and/or fixed hashing.

Figure 6:
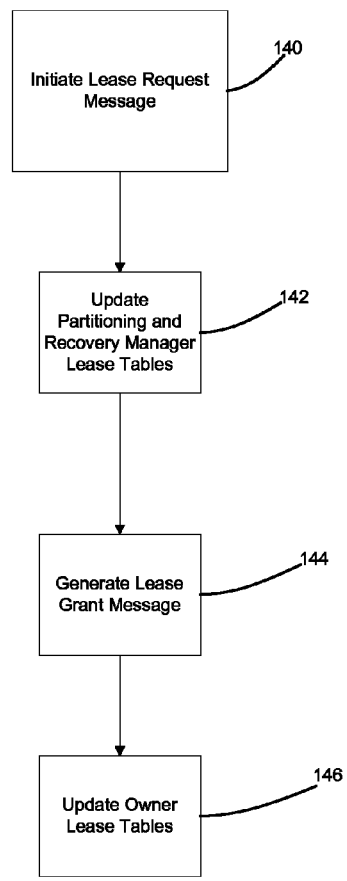
FIG. 6 is a flow chart illustrating a message protocol or procedure to generate leases for resources or buckets of resources.

As previously described, the partitioning and recovery manager 124 communicates with the one or more owners libraries 136 to generate the leases for buckets or resources. FIG. 6 illustrates an embodiment of a message sequence for generating leases for the buckets or resources. In an illustrated embodiment, a bucket including a SummaryKeyRange and lease version is defined using the following struct:

---

Struct VersionedBucket{
    SummaryKeyRange bucket
    uint leaseversion
}

---

As illustrated in step 140, the owner node 122 will initiate a lease request message. In one embodiment, the lease request message has the following format.

---

Struct LeaseRequestMSg {
    List<VersionedBucket> leasesToExtend
    DateTime ownerTimeWhenInitiateRequest
}

---

Figures 7, 8, 9:
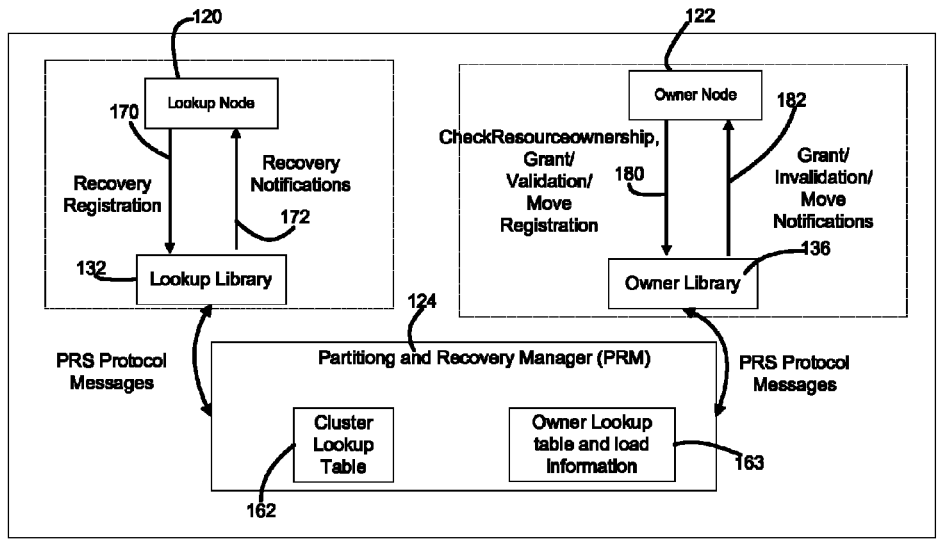
FIG. 7 illustrates an embodiment of a lease table of the partitioning and recovery manager.
FIG. 8 illustrates an embodiment of an owner library lease table.
FIG. 9 illustrates an embodiment of a data center including a partitioning and recovery manager, a lookup node and an owner node.

As illustrated in step 142 of FIG. 6, in response to the lease request message, the partitioning and recovery manager decides on the leases to grant to the owner node, and the new leases are written to the partitioning and recovery manager 124's lease table 150 shown in FIG. 7.

As illustrated in FIG. 6, in response to the lease request message, the partitioning and recovery manager 124 generates a lease grant message as shown in step 146 as follows.

---

Struct LeaseGrantMsg {
    List<VersionedBucket> leasesToExtend
    List<VersionedBucket> leasesToGrant
    DateTime   ownerTimeWhenInitiateRequest
    TimeSpan   leaseDuration
}

---

The lease grant message includes the lists of versioned buckets "leases to grant" and "leases to extend". As shown, the message format utilizes a compact data structure to provide a single message that includes a complete list of the leases held by the owner node 122. Any lease not mentioned in the message is interpreted as not being held or assigned to the owner node 122.

Since the lease message includes the entire lease state of an owner node 122 in a single message, the lease message is self-describing. Because it is self-describing, there is no need to send incremental lease updates to an owner library 136; the partitioning and recovery manager 124 sends all lease grants for the library in every message. Self-describing leases messages facilitate resource moves for load balancing, and reallocating ownership when new servers are brought online or servers are removed or crash, avoiding many of the protocol complexities faced by incremental lease updates.

In step 146, the owner library lease table 152 is updated as illustrated in FIG. 8.

FIG. 7 illustrates an embodiment of a partitioning and recovery manager (PRM) lease table 150. As shown in the illustrated embodiment of FIG. 7, the lease table 150 includes bucket or summary key range, lease version, expiry time and node address for the owner node 122 to which the lease is assigned. If no owner holds the lease, the node address is empty as shown.

In the illustrated embodiment shown in FIG. 9, the lookup library 132 is configured to lookup partitioned resources and also deliver recovery notifications to lookup nodes as shown in FIG. 9. The lookup library 132 exposes lookup methods to get location information about the resources. The lookup library 132 is internally structured to use a queue-based or event-driven programming model where an event loop processes tasks placed in a work queue. Operationally lookup calls are made to lookup library 132 to check in its memory cache 160 (as shown in FIG. 10) for address information. If the address information is not present the lookup library 132 queries the partitioning and recovery manager 124 as described herein and caches the results before returning the results to the lookup node 120.

In the illustrated embodiment shown in FIG. 9, the lookup library 132 is configured to lookup partitioned resources and also deliver recovery notifications to lookup nodes as shown in FIG. 9. The lookup library 134 exposes lookup methods to get location information about the resources. The lookup library 132 is internally structured to use a queue-based or event-driven programming model where an event loop processes tasks placed in a work queue. Operationally lookup calls are made to lookup library 132 to check in its memory cache 160 (as shown in FIG. 10) for address information. If the address information is not present the lookup library 132 queries the partitioning and recovery manager 124 as described herein and caches the results before returning the results to the lookup node 120.

A lookup call is initiated as follows.

```
void Lookup(
    ResourceAddress address,
    bool isRetry,
    LookupOutputHandler lookupHandler)
```

The lookupHandler supplies the following method for returning the results:

```
CreateLookupOutputEntry(
    ResourceAddress inputAddress,
    LookupResult result,
    ResourceAddress outputAddress);
```

An example interface or lookup method results include:

```
enum LookupResult {
    ResolveSucceeded,
    AlreadyFullyResolved,
    CannotResolveLocally,
    Failed
}
```

In the type or method above—ResolveSucceeded indicates that the address was resolved with more location information. AlreadyFullyResolved indicates that no further location information that the partitioning and recovery manager 124 can provide. CannotResolveLocally indicates that the caller can try resolution at a different (remote) entity e.g. the cluster specified is not the current cluster. Failed indicates that it could not resolve, e.g. the lookup library could not contact the partitioning and recovery manager.

When the lookup node 120 attempts to use the lookup library to further resolve a resource address, it may additionally specify IsRetry, a hint that the caller has recently performed a lookup on the same address and the resulting address turned out to be incorrect. When the lookup is done, the lookup library 132 schedules a lookupHandler on the caller's work queue with the appropriate lookup result about whether the call succeeded, and if so, the new address information.

In an illustrated embodiment, the data center or system 100 uses a hierarchical resource address methodology. The methodology includes ResourceAddress, GlobalResourceAddress, ClusterLevelResourceAddress and NodeLevelResourceAddress. The ResourceAddress is an abstract class to denote all resources of the system.

The GlobalResourceAddress is a location independent address that essentially corresponds to a generic resource name. The ClusterLevelResourceAddress is a location dependent address specifying the cluster 110 but not the particular owner node 122 within the cluster 110. The NodeLevelResourceAddress is a location dependent address specifying the particular owner node 122.

If a client device 104 passes in a GlobalResourceAddress, the lookup library 132 attempts to resolve it to a ClusterLevelResourceAddress. If the client device passes in a ClusterLevelResourceAddress the lookup library will verify if the cluster is the correct and if so, the lookup library 132 will attempt to resolve it to a node level resource address. If the client device 104 passes in a NodeLevelResourceAddress, the library does not further resolve the address. Although three hierarchical levels are present in the illustrated embodiment, application is not limited to the illustrated embodiments shown.

In the illustrated embodiment, in response to a lookup call, the lookup library checks the lookup library cache 160 as illustrated in FIG. 10 to determine if a summarykeyrange or bucket for a resource is in any cached ranges and if it is not, it generates a lookup message to the partitioning and recovery manager 124. In an illustrated embodiment, the lookup message format for the partitioning and recovery manager 124 is:

```
Struct LookupRequestMsg {
    GlobalResourceAddress key
    Bool noKnownPRMTime
    ulong lastPRMTime
}
```

The lastPRMTime is the time that the lookup library received in a previous LookupResponse message from the partitioning and recovery manager 124.

As shown in FIG. 9, the partitioning and recovery manager 124 includes a cluster lookup table 162 and owner lookup table 163. In response to the lookup request message, the partitioning and recovery manager checks the lookup tables 162, 163 to resolve the address. Next, the partitioning and recovery manager 124 generates a lookup response, which in an illustrated embodiment includes a complete mapping of buckets to nodes and a list of the buckets that have crashed.

The list of buckets crashed is constructed from a partitioning and recovery manager bucket crash table 164 illustrated in FIG. 11. The lookup library then updates a cache with a mapping of the buckets that have crashed. This information is used to generate recovery notification calls as described herein.

As illustrated in FIG. 9, messages between the lookup library 132 and the partitioning and recovery manager 124 communicate directly using a messaging layer or component. The lookup library 132 records metadata from earlier communications between the lookup library 132 and the partitioning and recovery manager 124 to detect crashes of the partitioning and recovery manager 124.

In an illustrated embodiment once the application receive the lookup result or address, an application or device 104 can contact or communicate with the owner node 122 directly without communicating through the partitioning and recovery manager 124 to retrieve the resource data.

In the illustrated embodiment shown in FIG. 9, the lookup library includes a recovery notification function. The recovery notification function is initiated via the following API or methods as illustrated by line 170 as follows:

```
void RegisterForRecoveryNotification(
        ResourceAddress address,
        RecoveryHandler recoveryHandler);
```

The recoveryHandler supplies the following method for returning the results to the lookup nodes via a recovery notification callback as illustrated by line 172 as follows:

```
CreateRecoveryNotificationEntry(
        ICollection<SummaryKeyRange> recoverRanges);
```

As previously described, the lookup node may not automatically learn that a resource or bucket is lost. In illustrated embodiments, the recovery notification registration function provides a call or notification as illustrated by line 172 in FIG. 9 to the lookup node 120 when a resource or bucket is potentially lost.

Recovery notification calls at the lookup library are initiated for crashed buckets after the lookup library 132 has learned about crashed buckets recorded in the partitioning and recovery manager crash table 164 shown in FIG. 11. Additionally, recovery notifications calls could be invoked by any of the following events
1. The partitioning and recovery manager 124 in the cluster where the resource lives is unreachable by the local lookup library 132, or it has crashed and restarted.
2. The partitioning and recovery manager 124 in the cluster where the resource lives loses touch with the resource owner node 122 (and hence cannot do a lease renewal).
3. The partitioning and recovery manager 124 in the cluster where the resource lives asks the resource owner node 122 to initiate a move and the move fails.

In one embodiment, the partitioning and recovery manager 124 is configured to periodically interface with the lookup libraries 132 to update the lookup library 132 and library cache with data relating to the partitioned resources. In particular, in one embodiment, the partitioning and recovery manager 124 initiates communication with the lookup libraries 132 to notify the lookup libraries 132 of crashed resources or buckets. As illustrated in FIG. 12, the partitioning and recovery manager 124 maintains a cache or table 174 of the time of last communication with the lookup libraries 132.

The owner library 136 is configured to store partitioned resources or buckets. The owner node 122 interfaces with the partitioning and recovery manager 124 through the owner library 126 as previously illustrated in FIG. 9. The owner library 136 includes implements various methods and functions to inform the owner node of ownership and indicate when to move resources due to a load imbalance or crash. The owner nodes 122 initiate calls or methods to the owner library 136 as illustrated by line 180 and receives callbacks as illustrated by line 182 to learn when ownership has been granted, when resources need to be invalidated and when resources need to be moved.

Illustratively, the interface or method for obtaining and validating ownership from the owner library 136 is implemented with the following call:

```
Bool TryGetOwnershipHandle(ResourceAddress key, out
OwnershipHandle handle);
```

An Owner node checks its ongoing ownership of a resource with the following call:
    bool CheckContinuousOwnership (OwnershipHandle handle).

The check continuous ownership function is configured to ascertain whether the owner node currently owns and whether it has continuously owned a resource or bucket since the resource or bucket was first acquired. The function or method uses an ownership handle to return the results.

Figure 13:
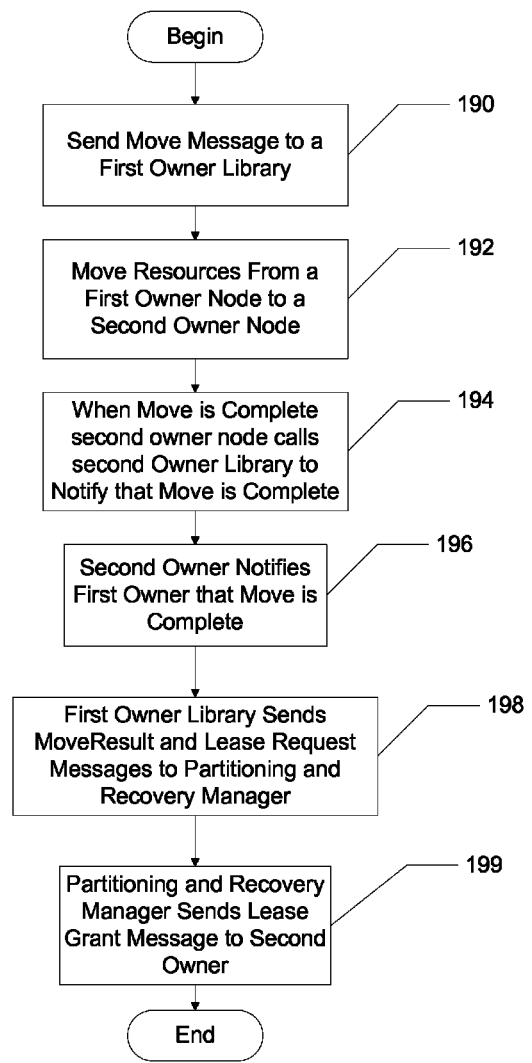
FIG. 13 is a flow chart illustrating a sequence for moving resources between owner nodes.

Resources are moved from one owner node to another in response to resource move messages from the partitioning and recovery manager 124. FIG. 13 illustrates an embodiment of a move sequence for moving resources or bucket of resources from a first owner node to a second owner node. To implement the move the partitioning and recovery manager 124 sends a resource move message to a first owner library as illustrated in step 200. In response to the resource move message, the first owner library instructs the owner node (via a move callback) to move the resources or bucket of resources from the first owner to a second owner as illustrated in step 192. Upon completion of the move, the second owner calls the second owner library to notify the second owner library that the move is complete as illustrated in step 194.

In step 196, the first owner library is notified via calls from the first owner node that the move is complete as illustrated in step 196. In step 198, the first owner library generates a move result message and lease request message to the partitioning and recovery manager 124. The partitioning and recovery manager 124 sends a lease grant message to the new or second owner in step 199. In an illustrated embodiment, move tables are generated to keep track of the success or failure of a move function.

Illustrated embodiments of the data management system have applications for managing information and services for various functions of a communication network, for example, for publish-subscribe services, queue services, device connectivity services, account services, authorization services, storage services, general notification services, and other services of a communication system or network, although application is not limited to these illustrated Embodiments and methods disclosed herein can be utilized to manage data across multiple clusters (e.g. inter-cluster partitioning) or across data centers. In particular, the lookup nodes 122 can be in different clusters or data centers 100 than the partitioning and recovery manager 124. Although the subject matter has been described in language specific to structural features and/or methodological acts, it is to be understood that the subject matter of the application is not necessarily limited to the specific features or acts described above. Rather, the specific features and acts described above are disclosed as illustrated examples.

What is claimed:

1. A partitioning system comprising:
   a partitioning manager for assigning leases to partition resources across the partitioning system, the partitioning manager being configured to generate a lease grant message in response to a lease request message;
   a lookup library configured to interface with the partitioning manager through one or more lookup function calls and to obtain an address or location of one or more of the partitioned resources based on a request from a client device; and
   an owner node comprising a computing device or server and including an owner library having a lease table, the owner node being configured to interface with the partitioning manage manager to handle ownership of a set of partitioned resources assigned to the owner node through one or more owner function calls, wherein the owner node is configured to:
   send the lease request message to the partitioning manager;
   receive the lease grant message that includes a complete list of all leases assigned to the owner node, comprising one or more leases to extend and one or more new leases to grant to the owner node; and
   update the lease table with the complete list of leases, the partitioning manager interfacing with the owner library to assign ownership of the one or more set of partitioned resources to the owner node.

2. The partitioning system of claim 1 wherein the partitioning manager uses load measurements from the one or more owner nodes in its decision to assign the set of partitioned resources to the owner node.

3. The partitioning system of claim 2 wherein the partitioning manager is configured to grant ownership of the set of one or more partitioned resources to the owner node.

4. The partitioning system of claim 3 wherein the owner library generates a lease request message and the partitioning manager is configured to use the lease request message to grant ownership of the set of one or more partitioned resources.

5. The partitioning system of claim 1 wherein the lookup and owner libraries cache partitioning data.

6. The partitioning system of claim 1 wherein the owner library includes a method or function to check continuous ownership of the set of one or more partitioned resources.

7. The partitioning system of claim 1, wherein the lookup library comprises a memory cache storing address information.

8. The partitioning system of claim 7, wherein the lookup library is configured to query the partitioning manager for particular address information if the particular address information is not found in the memory cache.

9. A computer-implemented method comprising:
   partitioning, with a partitioning manager, resources comprising soft state data across owner nodes, using a computer, to provide single copy serializability such that a same item of the soft state data is not simultaneously covered by multiple leases across different owner nodes, wherein partitioning comprises:
   generating a lease grant message to assign ownership of a particular item of the soft state data to, at most, a first one of the owner nodes at a given time, the lease grant message identifying one or more leases to extend and one or more new leases to grant to the first owner node; and
   communicating the lease grant message to an owner library of the first owner node to assign ownership of the particular item of the soft state data to the first owner node;
   sending a message from the partitioning manager that moves a resource or bucket from the first owner node to a second owner node;
   notifying the first owner library and a second owner library of completion of the move;
   receiving, at the partitioning manager, a lease request message from the first owner library; and
   sending a grant message from the partitioning manager to the second owner library following the move.

10. The method of claim 9 wherein the ownership assignment is communicated to one or more lookup nodes through lookup functions and calls of a lookup library.

11. A partitioning system comprising:
    a lease table that includes a set of leases assigned to a plurality of owner nodes, including at least a first set of leases assigned to a first owner node; and
    a computer including executable instructions for assigning leases to partition resources across the plurality of owner nodes, the computer being configured to:
    receive a lease request message from the first owner node;
    in response to the lease request message, generate one or more new leases for the first owner node and generate a lease grant message that identifies the first set of leases assigned to the first owner node as leases to extend and that identifies the one or more new leases as leases to grant to the first owner node, the lease grant message including a complete list of all leases assigned to the first owner node;
    update the lease table with the complete list of leases;
    interface with a lookup library to obtain an address or location of one or more of the partitioned resources; and
    send the lease grant message to the first owner node to assign ownership of the one or more partitioned resources to the first owner node.

12. The partitioning system of claim 11, wherein the lease grant message identifies the entire lease state of the first owner node.

13. The partitioning system of claim 11 wherein the lease grant message includes a list of buckets of resources for leases to extend or grant and a lease expiration.

14. The partitioning system of claim 13 wherein the buckets are identified by a summary key range and lease version.

15. The partitioning system of claim 11 wherein the lease table includes bucket or summary key range, lease version and expiry time.

16. The partitioning system of claim 11 wherein the computer uses load information from the owner nodes to generate the one or more new leases.

* * * * *